US006973623B2

(12) United States Patent
Little et al.

(10) Patent No.: US 6,973,623 B2
(45) Date of Patent: Dec. 6, 2005

(54) SYSTEM AND METHOD FOR CLIENT REFRESH MODE SELECTION

(75) Inventors: Alex D. Little, Raleigh, NC (US); John E. Lynde, III, Apex, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 09/881,458

(22) Filed: Jun. 14, 2001

(65) Prior Publication Data

US 2002/0194359 A1    Dec. 19, 2002

(51) Int. Cl.[7] .............................................. G06F 3/00
(52) U.S. Cl. ....................... 715/760; 715/738; 715/772
(58) Field of Search ................................ 715/760, 738, 715/772, 814, 844, 866; 709/217, 229

(56) References Cited

U.S. PATENT DOCUMENTS

| | | | |
|---|---|---|---|
| 4,611,277 A | 9/1986 | Kemppainen et al. | |
| 5,878,213 A | 3/1999 | Bittinger et al. | 395/200.33 |
| 5,907,681 A | 5/1999 | Bates et al. | 395/200.58 |
| 6,032,182 A | 2/2000 | Mullen-Schultz | 709/223 |
| 6,138,150 A | 10/2000 | Nichols et al. | 709/219 |
| 6,538,673 B1 * | 3/2003 | Maslov | 715/853 |
| 6,553,410 B2 * | 4/2003 | Kikinis | 709/218 |
| 6,668,273 B1 * | 12/2003 | Rust | 709/204 |
| 2001/0032175 A1 * | 10/2001 | Holden et al. | 705/37 |
| 2002/0103897 A1 * | 8/2002 | Rezvani et al. | 709/224 |

FOREIGN PATENT DOCUMENTS

WO    WO 01 22204 A    3/2001

OTHER PUBLICATIONS

Underwood, G. M. et al.: "User-centered push for timely information delivery" Computer Networks and ISDN System, North Holland Publishing. Amsterdam, NL. vol. 30, No. 1-7. (Apr. 1, 1998), pp. 33-41.

* cited by examiner

Primary Examiner—John Cabeca
Assistant Examiner—Brian J Detwiler
(74) Attorney, Agent, or Firm—VanLeeuwen & VanLeeuwen; Gerald R. Woods

(57) ABSTRACT

A system and method for integrating multiple refresh functions inline with a visible refresh button control is provided. When a user wants to change a type of refresh mode due to the type of work being performed, a user selects the refresh setup drop down arrow key. A user has a refresh mode selection of manual, manual override, or auto mode. A user also has a preferences area to set screen refresh trigger thresholds for manual override and auto mode. For example, a user can set a trigger to wait until a task is completed before performing a screen refresh. A user is able to manually perform a screen refresh in override and auto mode by pressing the refresh button. Further disclosed are an information handling system and a computer program product each providing multiple refresh mode functionality.

26 Claims, 8 Drawing Sheets

SYSTEM AND METHOD FOR CLIENT REFRESH MODE SELECTION

BACKGROUND OF THE INVENTION

1. Technical Field

The present invention relates in general to a method and system for providing a flexible refresh capability to clients. Still more particularly, the present invention relates to a method and system for integrating multiple refresh functions inline with a visible refresh button control.

2. Description of the Related Art

Computer users, or clients, seldom rely just on information included in their own storage. Clients are now networked together to share information between clients and servers. On a global scale, the Internet allows clients to access other clients or servers from around the world. On a local scale, clients are connected to each other in businesses and households to share files on local area networks (LANs) or intranets.

Information being accessed by one client from another computer system usually has a time sensitive level. Some information is extremely time sensitive based on the type of information and who is viewing it. For example, stock quotes are extremely time sensitive to day-traders. Day-traders want a constant update on stock prices. However, a long term investor is not as interested in the minute to minute price fluctuations that occur daily, and may just be interested in the closing stock price for the day. Many types of information have little time sensitivity. For example, information relating to historical events are not very time sensitive and a user may not be concerned about the most up-to-date version.

Refresh controls are useful components for clients using a network-oriented user interface in which data comes from a remote server. Refresh controls play a useful role in keeping clients updated with recent information. However, refresh controls in software programs such as Notes™, Internet Explorer™, and Netscape Communicator™ include prominently displayed tool bar buttons which are manual in nature.

When a refresh button is pushed, clients request information from servers based on what is being displayed (URL for the Internet). A client receives information and displays new information on the screen. No comparison is made as to what changed in the information. On the other hand, automated screen refreshes can simplify things for users since the screen refreshes automatically. However, automated refresh can leave users out of control and cause frustrations and complaints. For example, a user may be reading a screen that is updated using an automatic refresh function. Because the refresh is automatic, the screen is updated regardless of whether the user has finished reading the displayed data. This can leave users confused and unable to easily find the information they were reading before the refresh took place. Automated refreshing can be useful at times, but users often need manual overrides and an easy way to shut automation off and on.

Although it might seem acceptable to have either an automated refresh user interface or manual refresh user interface, neither simplistic solution is the right choice for a user every time. What is needed, therefore, is a way to allow the user to control the screen refresh and choose whether the refresh is manual, automated, or includes a manual override capability.

SUMMARY

It has been discovered that by providing an inline drop down menu for a user to quickly and easily switch between manual, manual override, and automated refresh modes, a user can customize an interface to provide a suitable refresh setting. Settings can range from a user having complete manual control of when refreshes occur, to automated control where a user does not have to be concerned with viewing the most up-to-date information.

Manual mode is used when a user wants control of screen refreshes. When a user presses the refresh button, a client retrieves up-to-date information from a server (or other client), and refreshes the screen with the new data. When a user wants to have a semi-automated screen refresh, a user selects manual override mode. In manual override mode, the user is in manual mode until trigger levels are reached. Once the trigger levels are reached, the user moves to auto refresh mode. For example, if a user is normally in auto refresh mode but does not want the screen refreshed until the task is completed, a user selects manual override mode and sets a manual override refresh trigger to wait until the task is completed before moving back to auto refresh mode. Other examples of manual override trigger levels include waiting for a specific time interval before refreshing and waiting for a period of user inactivity before refreshing.

Automatic refresh mode is used when a user wants to view the most updated information without having to manually press the refresh button. A user sets auto mode trigger levels which, when reached, automatically refresh a display. For example, a user may not want to be bothered with a screen refresh, or does not want to take up bandwidth loading new information unless a significant change is present between what is currently displayed and new data on the server. A user can select auto refresh mode and set an auto mode trigger to refresh a screen once a certain percentage of information has changed.

The refresh menu can include a "Preferences" screen where a user selects manual override and auto refresh triggers. The user can select one or more triggers for either mode.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
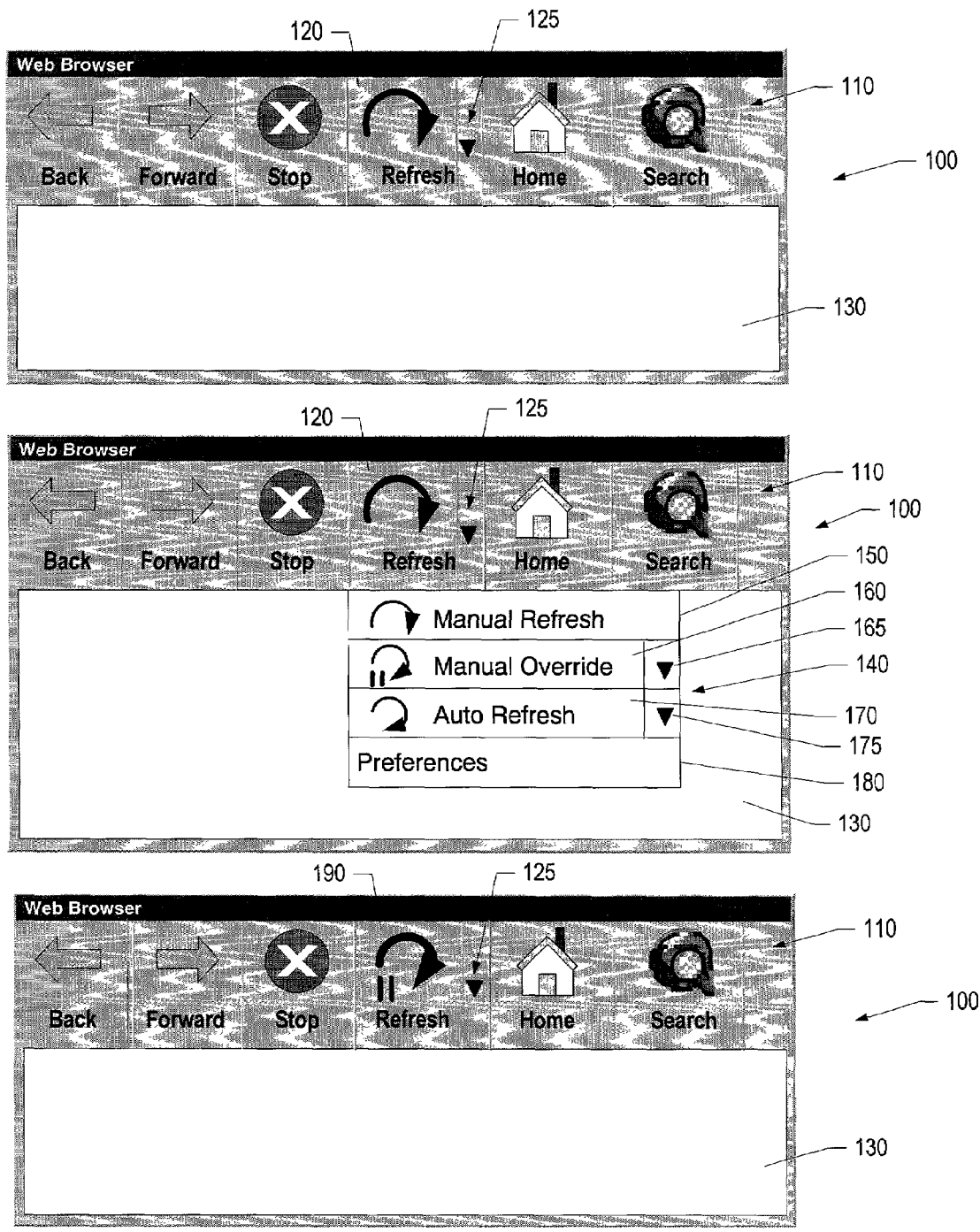
FIG. 1 is a series of screen diagrams where a user is selecting a refresh mode.

FIG. 1 is a series of screen diagrams where a user selects manual override mode. Web browser 100 includes toolbar 110 that has a variety of icons. Those skilled in the art will appreciate that web browser 100 can be a non-web based software program that has the ability to provide screen refreshes. Lotus Notes™ software, for example, has a screen refresh control that is primarily intended to share information between clients viewing shared data. Refresh Icon 120 is included in toolbar 110 and indicates that the client is in manual refresh mode in the top screen. Manual refresh mode means that display area 130 is updated when a user presses refresh button 120.

The middle screen shows a user selecting setup drop down arrow 125 (i.e., using a keyboard, mouse, or other pointing device) which causes the display of refresh menu 140. Refresh menu 140 includes manual refresh selection 150, Manual override selection 160, auto refresh selection 170, and preferences selection 180. If manual refresh 150 is selected, screen refreshes are in control of the user and occur when the user presses the refresh icon (see FIG. 4 for processing details). If manual override 160 is selected, screen refreshes occur when manual override triggers reach threshold (see FIG. 5 for processing details). If auto refresh 170 is selected, refreshes occur when auto refresh triggers reach threshold (see FIG. 6 for processing details). If preferences 180 is selected, menu 700 is displayed (see FIG. 7 for further details) whereupon the user can select trigger levels for manual override and auto refresh modes. In one embodiment, Preferences configuration can also be viewed by selecting manual override drop down arrow 165 (to view manual override preferences) or auto refresh drop down arrow 175 (to view auto refresh preferences). In the example shown in FIG. 1, the user selected manual override 160. The third screen shows manual override icon 190 being displayed in toolbar 110. The client is now in manual override mode. The user can repeatedly change the refresh mode and/or the refresh preferences by selecting drop down arrow 125 and selecting the desired refresh options.

Figure 2A:
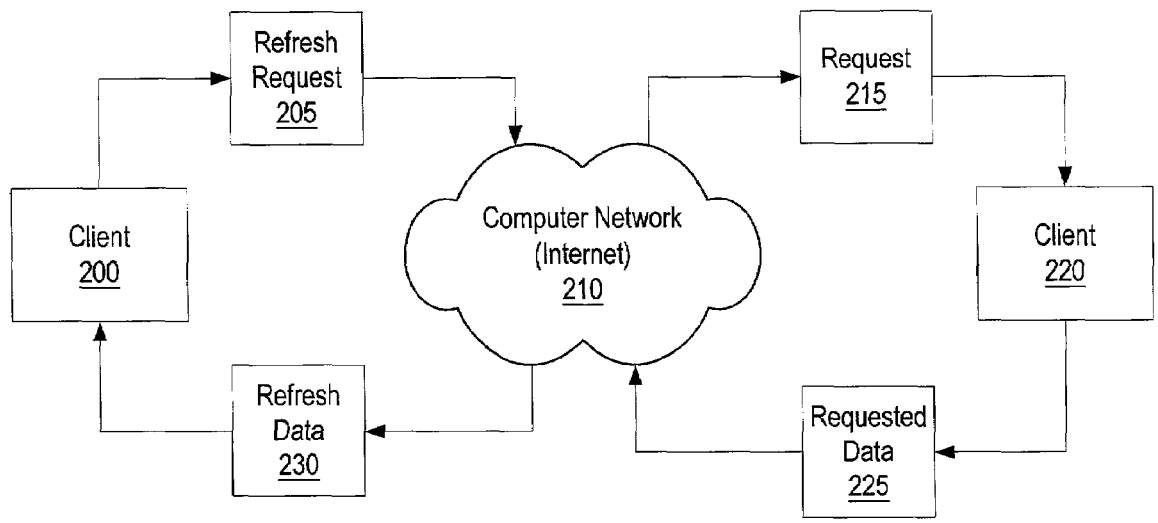
FIG. 2a is a system diagram of a client computer system requesting refreshed data from a server computer.

FIG. 2a shows a system diagram of a client computer system requesting refreshed data from a server computer. Client system 200, using any of the refresh modes described herein, issues refresh request 205 in order to refresh data displayed on client system 200. Refresh request 205 is sent through computer network 210, such as the Internet, to server 220. Server 220 receives request 215 from computer network 210 that identifies client 200 as the requesting party. Server 220 prepares the refreshed data and sends requested data 225 back to client 200 through computer network 210. Client 200 receives refresh data 230 from computer network 210 and uses the new data to refresh a display screen associated with client 200. In addition, refresh requests and corresponding refresh data can be used to determine whether the screen needs to be updated. For example, in some refresh modes the screen is only updated when a certain amount of the data currently being displayed is no longer current. When this threshold is reached, the new data is used to refresh the screen, otherwise the new data is not used and the user continues to view the original data displayed on the display screen.

Figure 2B:
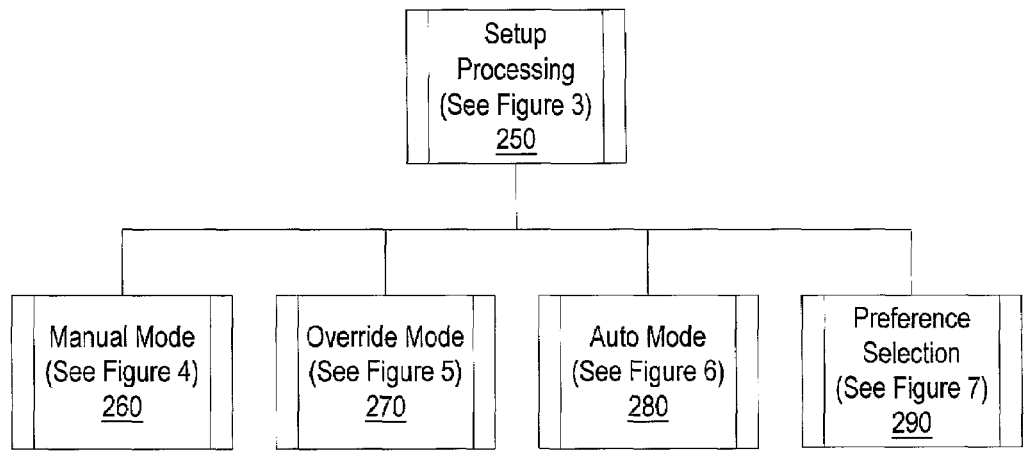
FIG. 2b is a hierarchy diagram showing different modes in setup processing.

FIG. 2b shows a hierarchy diagram showing different modes in setup processing. Setup processing 250 occurs when the user selects a setup drop down arrow available from a refresh mode icon (see drop down arrow 125 in FIG. 1 for an example). For a more detailed description of setup processing steps see FIG. 3. If a user wants control over when screen refreshes occur, the user selects manual mode processing 260. In response, a manual refresh mode icon is displayed informing the user that he is using manual refresh mode. When the manual refresh mode icon is selected by the user a refresh occurs (see FIG. 4 for further processing details). If a user wants to temporarily be in manual refresh mode, he selects manual override processing 270. In response, a manual override icon is displayed informing the user that he is using manual override refresh mode. When the manual override icon is selected by the user a refresh occurs (see FIG. 5 for further processing details). In addition, when a certain threshold, or trigger, occurs the refresh mode changes to automatic refresh mode (see FIG. 6 for a detailed description of automatic refresh processing and FIG. 7 for example manual override triggers). If the user desires automated refreshes, he selects automatic processing 280. In response, an automatic refresh icon is displayed informing the user that he is using automatic refresh mode. When the automatic refresh icon is selected by the user a refresh occurs (see FIG. 6 for further processing details). In addition, when certain thresholds, or triggers, occur an automatic refresh occurs (see FIG. 7 for example automatic refresh triggers). When the user wants to set trigger levels for manual override refresh and auto refresh modes, he selects preference processing 290 and the preference screen is displayed (see FIG. 7 for an example preferences screen).

Figure 3:
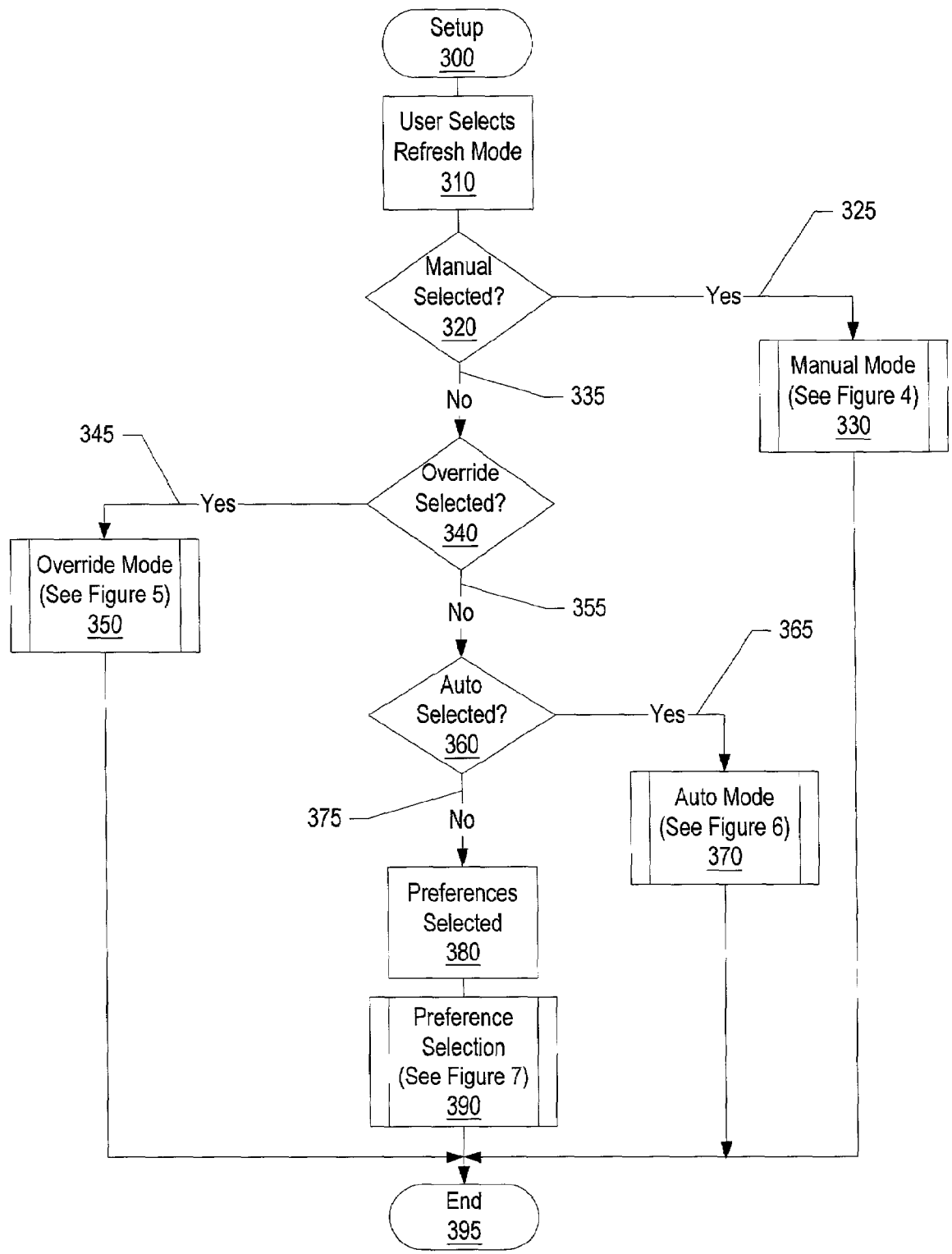
FIG. 3 is a flowchart showing the setup process for determining a user selected mode.

FIG. 3 shows a setup process determining which mode is selected. Setup processing commences at 300, whereupon a user selects a refresh mode (step 310). A determination is made as to whether the user selected manual refresh mode (decision 320). If the user selects manual refresh, decision 320 branches to "yes" branch 325 whereupon Manual mode is processed (pre-defined process 330, see FIG. 4 for further details). On the other hand, if the user does not select manual refresh mode, decision 320 branches to "no" branch 335 whereupon a determination is made as to whether the user selected manual override mode (determination 340). If the user selected manual override mode, decision 340 branches to "yes" branch 345 whereupon Override mode is processed (pre-defined process 350, see FIG. 5 for further details). On the other hand, if the user does not select manual override mode, decision 340 branches to "no" branch 355 whereupon a determination is made as to whether the user selected auto refresh mode (decision 360). If the user selected auto refresh mode, decision 360 branches to "yes" branch 365 whereupon Auto mode is processed (pre-defined process 370, See FIG. 6 for further details). On the other hand, if a user did not select auto mode, decision 360 branches to "no" branch 375 whereupon it is determined that the user selected preferences (step 380) and a preference selection screen is displayed and processed (pre-defined process block 390, see FIG. 7 for further details). Once the selected processing finishes, the setup process ends at 395.

Figure 4:
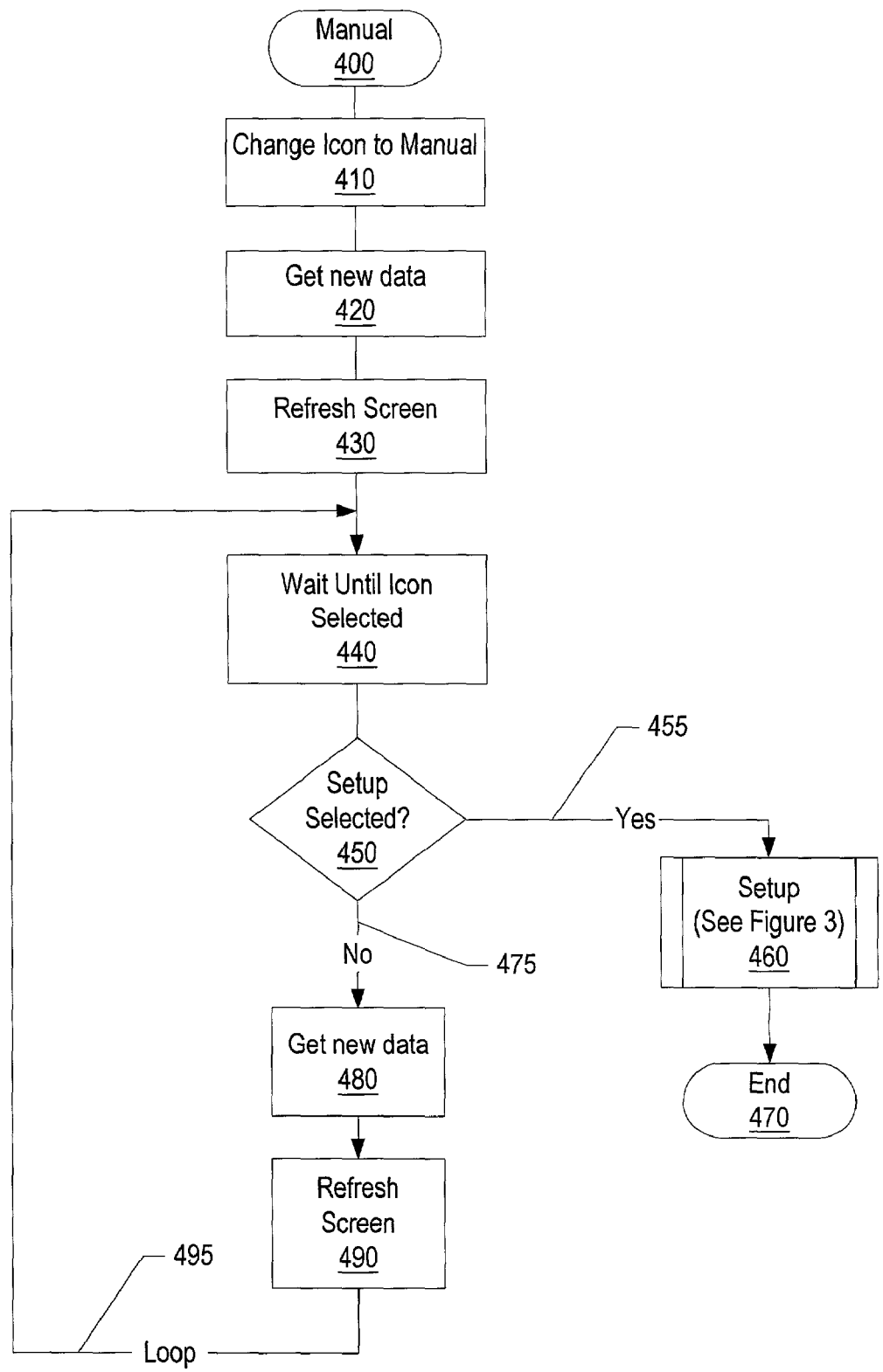
FIG. 4 is a flowchart showing the manual mode which refreshes the screen when the refresh button is pressed.

FIG. 4 shows a manual mode process refreshing a screen and waiting for a refresh button to be pressed. Manual mode processing commences at 400, whereupon the refresh icon is changed to display the manual mode refresh icon (step 410). The client computer system receives new data from a server (step 420), whereupon the client display screen is refreshed with new data (step 430). Processing waits until the refresh icon is pressed again (step 440), either to request a refresh, or to change the refresh mode. A user presses the refresh icon, and a determination is made as to whether the user selected setup mode (i.e., by pressing drop down arrow 125 shown in FIG. 1), or the user requested a screen refresh (decision 450). If the user selected setup processing, decision 450 branches to "yes" branch 455 whereupon setup processing is performed (pre-defined process 460, see FIG. 3 for further details). On the other hand, if the user wants the screen refreshed, decision 450 branches to "no" branch 475 whereupon the client computer system receives new data from the server being used by the client (step 480). The screen is refreshed (step 490) using the received data, whereupon processing loops back (loop 495) and waits for the refresh Icon to be pressed. This looping continues until the user requests setup processing (decision 450 branching to "yes" branch 455) or until the application is terminated.

Figure 5:
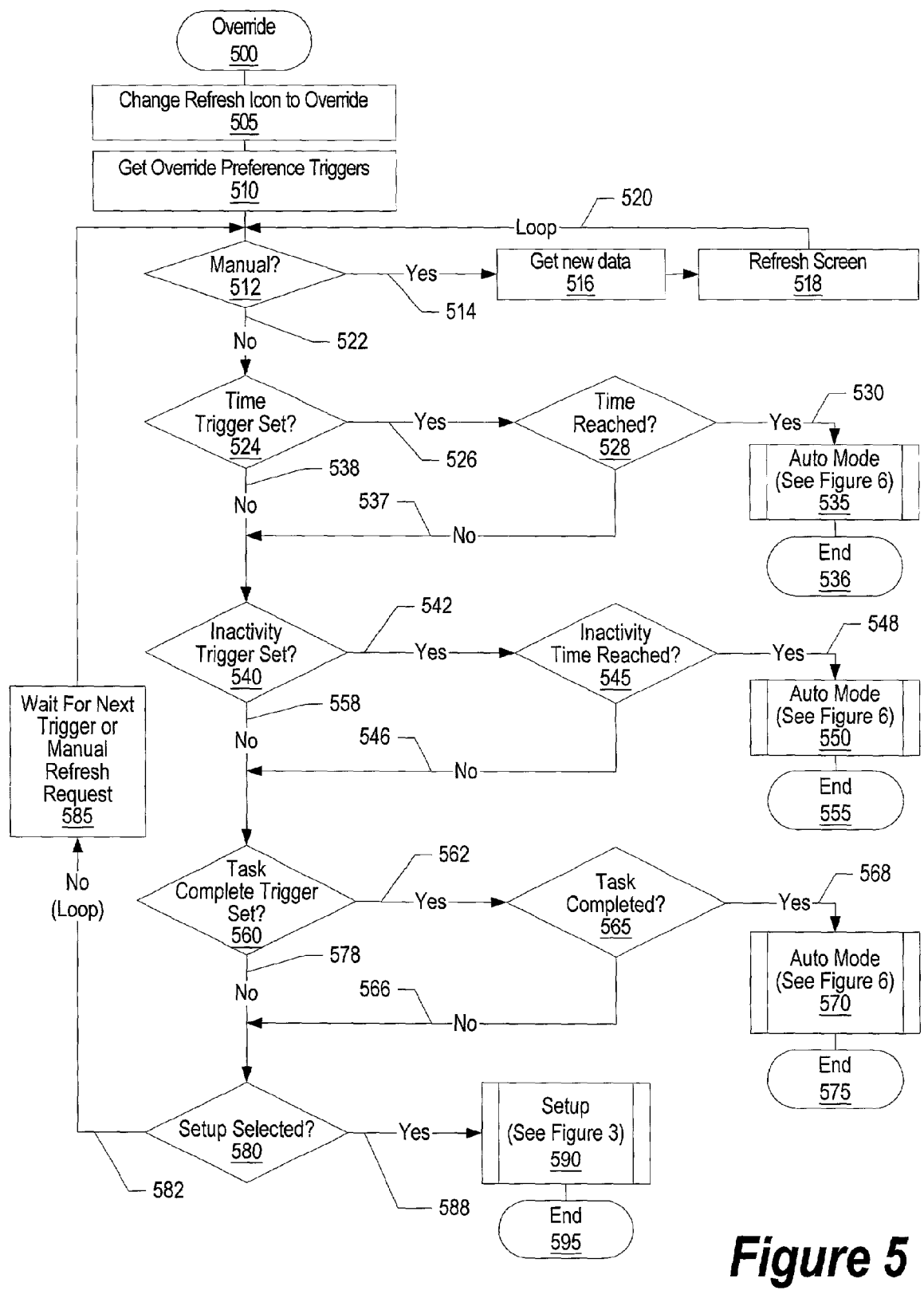
FIG. 5 is a flowchart showing the manual override mode determining which triggers are set and refreshing a screen when trigger limits are reached.

FIG. 5 shows the manual override mode determining which triggers are set and entering automatic refresh mode when a trigger is reached. Override processing commences at 500, whereupon the refresh icon is changed to the manual override icon to indicate that the system is in manual override mode (step 505). Manual override triggers are obtained from a data area (step 510). These preferences were set by the user using a preferences menu (see FIG. 7 for an example preferences menu). In this example, a user can select one or more triggers.

A determination is made as to whether the user selected the refresh icon to request a refresh of the screen data (decision 512). If the user did select the refresh icon, decision 512 branches to "yes" branch 514 whereupon new data is retrieved from a server (step 516) and the user's display screen is refreshed accordingly (step 518). Processing then loops back to process the next refresh request or the next manual override trigger (loop 520).

On the other hand, if the user did not select the refresh icon to request a refresh of the screen data, decision 512 branches to "no" branch 522 whereupon a determination is made as to whether the time interval trigger is selected (decision 524). If the time interval trigger is not selected, decision 515 branches to "no" branch whereupon a determination is made as to whether the inactivity trigger is selected (decision 540). On the other hand, if the time interval trigger is selected, decision 524 branches to "yes" branch 526 whereupon a determination is made as to whether the time interval the user specified in the preferences has been reached (decision 528). If the time interval has not been reached, decision 528 branches to "no" branch 537 whereupon a determination is made as to whether the inactivity trigger is selected (decision 540). On the other hand, if the time interval is reached, decision 528 branches to "yes" branch 530 whereupon the client's system leaves manual override mode and enters auto refresh mode (pre-defined process 535, see FIG. 6 for details regarding auto refresh processing) and manual override processing ends at 536.

A determination is made as to whether the user selected a user inactivity period as a trigger (decision 540). If user inactivity period is not selected, decision 540 branches to "no" branch 558 whereupon a determination is made as to whether the user selected task completion trigger (decision 560). On the other hand, if a user inactivity period is selected, decision 540 branches to "yes" branch 542 whereupon a determination is made as to whether the user inactivity time specified in a preferences (or configuration) data area has been reached (decision 545). If the user inactivity period has not been reached, decision 545 branches to "no" branch 546 whereupon a determination is made as to whether the task completion trigger is selected (decision 560). On the other hand, if the user inactivity period has been reached, decision 545 branches to "yes" branch 548 whereupon the client's system leaves manual override mode and enters auto refresh mode (predefined process 550, see FIG. 6 for details regarding auto refresh processing) and manual override processing ends at 555.

A determination is made as to whether the user selected task completion as a trigger (decision 560). If the task completion trigger is not selected, decision 560 branches to "no" branch 578 whereupon a determination is made as to whether the user requested setup processing (decision 580). On the other hand, if task completion trigger is selected, decision 560 branches to "yes" branch 562 whereupon a determination is made as to whether the user is finished with the task (decision 565). If the user has not completed the task, decision 565 branches to "no" branch 546 whereupon a determination is made as to whether the user requested setup processing (decision 580). On the other hand, if the user is finished with the task, decision 565 branches to "yes" branch 568 whereupon the client's system leaves manual override mode and enters auto refresh mode (predefined process 570, see FIG. 6 for details regarding auto refresh processing) and manual override processing ends at 575.

A determination is made as to whether the user requested setup processing (decision 580). If requested setup processing (i.e., by pressing down arrow 125 in FIG. 1), decision 580 branches to "yes" branch 588 whereupon setup processing is performed (predefined process 590, See FIG. 3 for further details) and manual override processing ends at 595. On the other hand, none of the triggers have occurred the system remains in manual override mode and decision 580 branches to "no" branch 582 which waits for the occurrence of the next trigger or for the user to request a manual refresh (step 585). This looping continues until a trigger occurs or until the application is terminated.

As will be appreciated by those skilled in the art, the triggers employed by the manual override refresh processing are non-exclusive examples of possible triggers that can be used. In addition, the additional triggers shown for automatic processing (severity trigger, change amount trigger, etc.) and other triggers may be used in addition to or in place of the triggers described for manual override refresh processing shown in FIG. 5.

Figure 6:
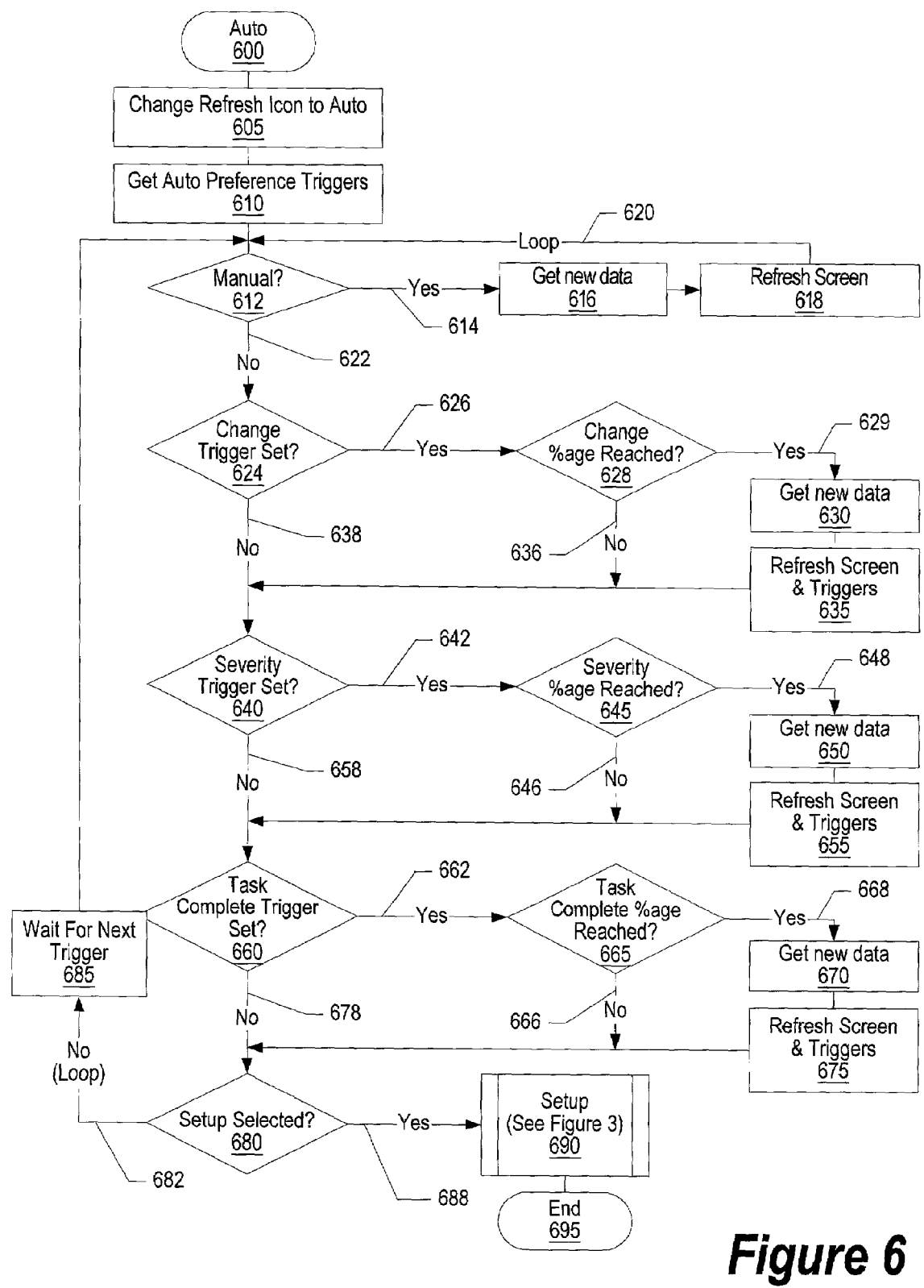
FIG. 6 is a flowchart showing the auto mode determining which triggers are set and refreshing a screen when trigger limits are reached.

FIG. 6 shows the auto mode determining which trigger is set and refreshing the screen when trigger limits are reached. Auto refresh processing commences at 600, whereupon the refresh icon is changed to the auto refresh icon so that the user is aware that the system is operating in auto refresh mode (step 605). Auto refresh triggers are retrieved from a data area (step 610). These triggers may have been previously set by the user in a preferences menu (see FIG. 7 for an example of a preferences menu). In this example, a user can select one or more automatic triggers.

A determination is made as to whether the user selected the refresh icon to request a refresh of the screen data (decision 612). If the user did select the refresh icon, decision 612 branches to "yes" branch 614 whereupon new data is retrieved from a server (step 616) and the user's display screen is refreshed accordingly (step 618). Processing then loops back to process the next refresh request or the next manual override trigger (loop 620).

On the other hand, if the user did not select the refresh icon to request a refresh of the screen data, decision 612 branches to "no" branch 622 whereupon a determination is made as to whether the user has requested automatic refreshes based on the amount of change between the screen being displayed and the data on the server (decision 624). If the change percentage trigger is not selected, decision 624 branches to "no" branch 638 whereupon a determination is made as to whether the user wants a refresh based on the severity of change between the screen being displayed and the server (decision 640). On the other hand, if the change percentage trigger is selected, decision 624 branches to "yes" branch 626 whereupon a determination is made as to whether the change percentage the user specified in the preferences is reached (decision 628). Decision 628 would include requesting the information from the server and comparing the received information to the information currently displayed on the display screen. If the change percentage is not reached, decision 628 branches to "no" branch 636 whereupon a determination is made as to whether the severity percentage trigger is selected (decision 640). On the other hand, if the change percentage is reached, decision 628 branches to "yes" branch 629 whereupon the client computer system receives new data from the server (step 630). The screen refreshes using the received data and the change percentage trigger is reset (step 635).

A determination is made as to whether the user wants a refresh based on the severity of change between the screen being displayed and the data currently on the server (decision 640). If severity percentage has not been selected, decision 640 branches to "no" branch 658 whereupon a determination is made as to whether the user selected task completion trigger (decision 660). On the other hand, if severity percentage has been selected, decision 640 branches to "yes" branch 642 whereupon a determination is made as to whether the severity percentage specified by the user in the preferences has been reached (decision 645). Decision 645 would also include requesting the information from the server and comparing the received information to the information currently displayed on the display screen. If the severity percentage has not been reached, decision 645 branches to "no" branch 646 whereupon a determination is made as to whether the task completion trigger is selected (decision 660). On the other hand, if the severity percentage has been reached, decision 645 branches to "yes" branch 648 whereupon a client computer system receives new data from the server (step 650). The screen refreshes and resets the user severity trigger (step 655).

A determination is made as to whether the user selected task completion as a trigger (decision 660). If user task completion trigger is not selected, decision 660 branches to "no" branch 678 whereupon a determination is made as to whether the user requested setup processing (decision 680). On the other hand, if task completion trigger is selected, decision 660 branches to "yes" branch 662 whereupon a determination is made as to whether the user is finished with the task (decision 665). If the user has not completed the task, decision 665 branches to "no" branch 666 whereupon a determination is made as to whether the user decides to change modes and go into setup (decision 680). On the other hand, if the user finished the task, decision 665 branches to "yes" branch 668 whereupon the client computer system receives new data from a server (step 670). using the received data and the task completion trigger is reset (step 675).

A determination is made as to whether the user requested setup processing (decision 680). If the user requested setup processing, decision 680 branches to "yes" branch 688 whereupon setup processing is performed (predefined process 690, See FIG. 3 for further details) and automatic refresh processing ends (return 695). On the other hand, if the user did not request setup processing, decision 680 branches to "no" branch 682 which waits for the next trigger to occur or manual refresh to be requested (step 685) and loops back to processes the trigger or refresh request. This looping continues until the user requests setup processing (decision 680 branches to "yes" branch 688) or the application is terminated.

As will be appreciated by those skilled in the art, the triggers employed by the automatic refresh processing are non-exclusive examples of possible triggers that can be used. In addition, the additional triggers shown for manual override processing (time interval trigger, user inactivity trigger, etc.) and other triggers may be used in addition to or in place of the triggers described for automatic refresh processing shown in FIG. 6.

Figure 7:
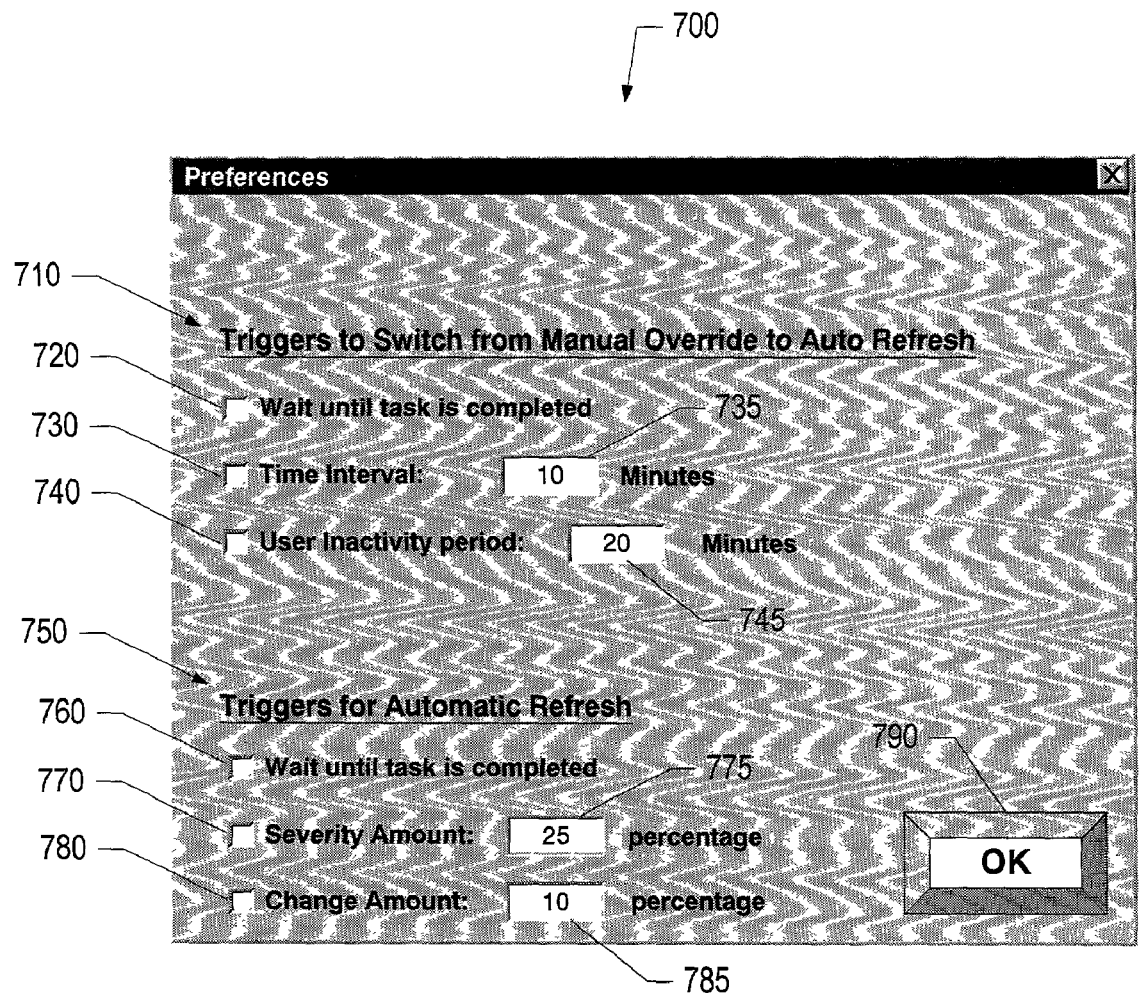
FIG. 7 is a preference screen diagram showing user chosen trigger options for manual, override, and automated refresh modes.

FIG. 7 shows a preference screen diagram and the trigger options for manual override and automated refresh. Preference screen 700 is displayed to the user when the user selects "preferences" from the refresh icon drop down toolbar. Preference screen 700 is used to customize refresh period intervals when the user is in Manual Override mode or Auto Refresh mode. In this example, Triggers to switch from Manual Override to Auto Refresh 710 has three options. The user can select one or more of these options. For the first option, the user selects checkbox 720 if he wants to wait until after the task being worked on is completed. For the second option, the user selects checkbox 730 if he wants to specify a time interval for screen refresh. The user enters the time interval in minutes in input box 735. For the third option, the user selects checkbox 740 if he wants a screen refresh when the user is inactive for a length of time. The user enters the inactivity length of time in minutes in input box 745.

Triggers for Automatic Refreshes 750 has three options. The user can select one or more of these options. For the first option, the user selects checkbox 760 if he wants to wait until after the task being worked on is completed. For the second option, the user selects box 770 if he wants a screen refresh when the severity of change between the current screen and data on the server reaches a certain percentage. The user enters the severity percentage in input box 775. For the third option, the user selects checkbox 780 if he wants a screen refresh when the amount of change between the current screen and data on the server reaches a certain percentage. The user enters the change amount percentage in input box 785.

The user presses OK command button 790 to enter the preferences. The preferences are then stored and used by the manual override and automatic refresh processes. It will be appreciated by those skilled in the art that the triggers shown in FIG. 7 are nonexclusive examples and are by no way limiting of the number or types of triggers that can be used for the processing shown herein.

Figure 8:
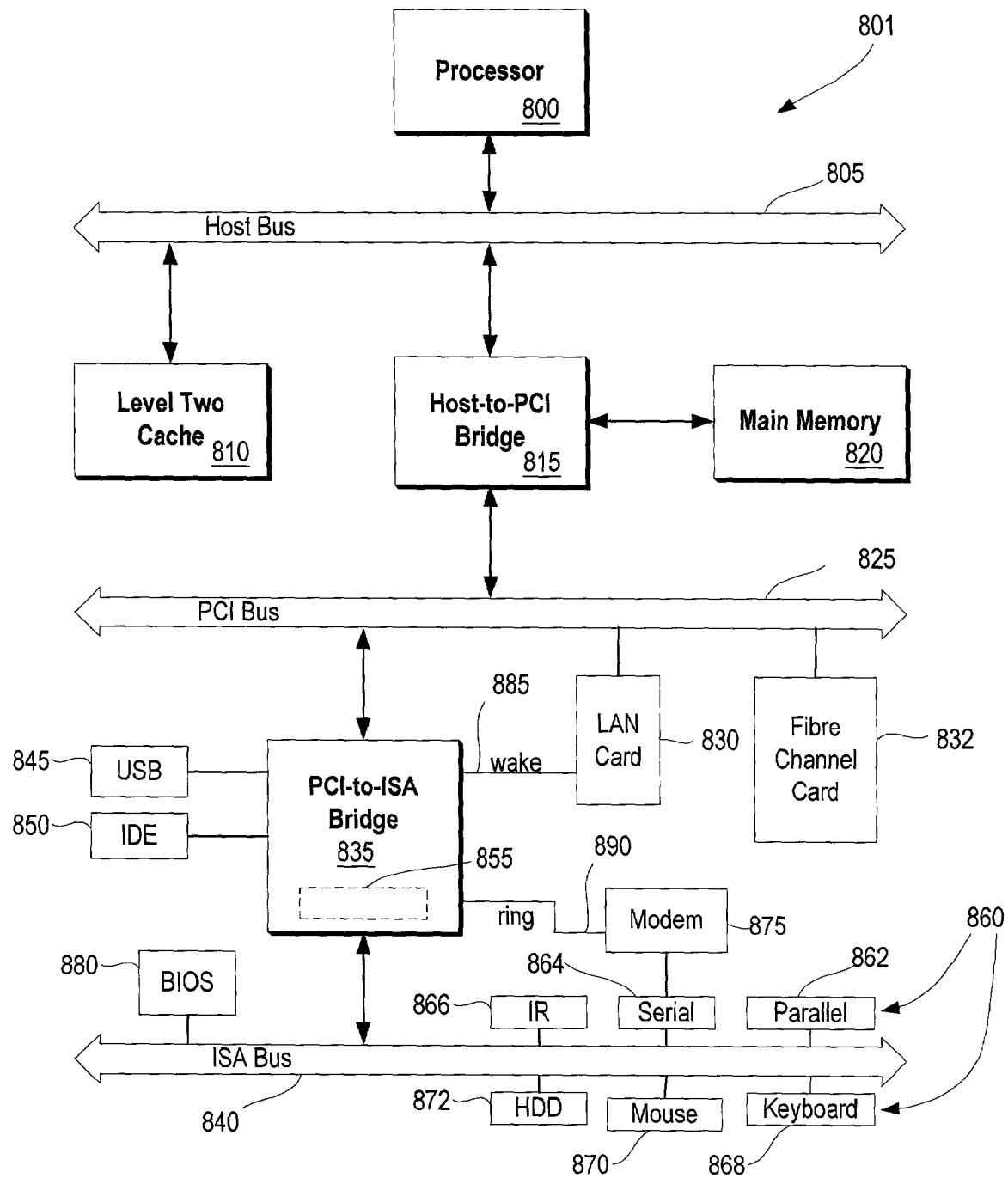
FIG. 8 is a block diagram of an information handling system capable of performing the present invention.

FIG. 8 illustrates information handling system 801 which is a simplified example of a computer system capable of performing the copy processing described herein. Computer system 801 includes processor 800 which is coupled to host bus 805. A level two (L2) cache memory 810 is also coupled to the host bus 805. Host-to-PCI bridge 815 is coupled to main memory 820, includes cache memory and main memory control functions, and provides bus control to handle transfers among PCI bus 825, processor 800, L2 cache 810, main memory 820, and host bus 805. PCI bus 825 provides an interface for a variety of devices including, for example, LAN card 830. PCI-to-ISA bridge 835 provides bus control to handle transfers between PCI bus 825 and ISA bus 840, universal serial bus (USB) functionality 845, IDE device functionality 850, power management functionality 855, and can include other functional elements not shown, such as a real-time clock (RTC), DMA control, interrupt support, and system management bus support. Peripheral devices and input/output (I/O) devices can be attached to various interfaces 860 (e.g., parallel interface 862, serial interface 864, infrared (IR) interface 866, keyboard interface 868, mouse interface 870, and fixed disk (FDD) 872) coupled to ISA bus 840. Alternatively, many I/O devices can be accommodated by a super I/O controller (not shown) attached to ISA bus 840.

BIOS 880 is coupled to ISA bus 840, and incorporates the necessary processor executable code for a variety of low-level system functions and system boot functions. BIOS 880 can be stored in any computer readable medium, including magnetic storage media, optical storage media, flash memory, random access memory, read only memory, and communications media conveying signals encoding the instructions (e.g., signals from a network). In order to attach computer system 801 another computer system to copy files over a network, LAN card 830 is coupled to PCI-to-ISA bridge 835. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for providing customized screen refresh functions, said method comprising:
   providing a plurality of user-selectable refresh modes, including a manual refresh mode, a manual override mode, and an automatic refresh mode;
   retrieving one or more first customizable refresh settings, wherein the first customizable refresh settings correspond to a first refresh mode selected from the plurality of user-selectable refresh modes;
   comparing the first customizable refresh settings with corresponding system event data; and
   refreshing a display screen in response to the comparing, wherein while in the manual refresh mode, the refreshing is performed in response to a user selecting a refresh icon, wile in the automatic refresh mode, the refreshing is performed in response to the comparing, and while in the manual override mode, the refreshing is performed manually until one or more trigger levels are reached that cause the refreshing to be done in response to the comparing.

2. The method as described in claim 1 further comprising:
   changing from the first refresh mode to a second refresh mode in response to the comparing, wherein the second refresh mode is selected from the plurality of user-selectable refresh modes, and wherein the changing includes retrieving one or more second customizable refresh settings corresponding to the second refresh mode.

3. The method as described in claim 2 further comprising:
   displaying a first refresh icon on the display screen corresponding to the first refresh mode; and
   displaying a second refresh icon on the display screen corresponding to the second refresh mode in response to the changing.

4. The method as described in claim 1 wherein at least one of the first customizable refresh settings is selected from the group consisting of waiting for a task to complete, waiting for a time interval, waiting for a user inactivity period, receiving a change request from a user, and measuring an amount of stale data displayed on the display screen.

5. The method as described in claim 1 further comprising:
   displaying a refresh icon on the display screen that identifies the first refresh mode.

6. The method as described in claim 1 further comprising:
   requesting refresh data from a server in response to the comparing; and receiving the refresh data from the server, wherein the refreshing includes displaying the refresh data on the display screen.

7. The method as described in claim 1 further comprising:
receiving one or more refresh setting values from a user, each of the refresh setting values corresponding to at least one of the first customizable refresh settings; and
storing the refresh setting values.

8. An information handling system comprising:
one or more processors;
a memory accessible by the processors;
a nonvolatile storage area accessible by the processors;
a display screen accessible by the processors;
an input device capable of a receiving input from a user corresponding to data displayed on the display screen; and
a customizable screen refresh tool to control a refresh of the display screen, the customizable screen refresh tool including:
selection logic for providing a plurality of user-selectable refresh modes, including a manual refresh mode a manual override mode, and an automatic refresh mode;
retrieval logic for retrieving one or more first customizable refresh settings, wherein the first customizable refresh settings correspond to a first refresh mode selected from the plurality of user-selectable refresh modes;
comparison logic for comparing the first customizable refresh settings with corresponding system event data; and
display control logic for refreshing the display screen in response to the comparison, wherein while in the manual refresh mode, the refreshing is performed in response to user selecting a refresh con, while in the automatic refresh mode, the refreshing is performed in response to the comparing, and while in the manual override mode, the refreshing is performed manually until one or more trigger levels are reached that cause the refreshing to be done in response to the comparing.

9. The information handling system as described in claim 8 further comprising:
control logic for changing from the first refresh mode to a second refresh mode in response to the comparison, wherein the second refresh mode is selected from the plurality of user-selectable refresh modes, and wherein the changing includes means for retrieving one or more second customizable refresh settings corresponding to the second refresh mode.

10. The information handling system as described in claim 9 further comprising:
display logic for displaying a first refresh icon on the display screen corresponding to the first refresh mode; and
display logic for displaying a second refresh icon on the display screen corresponding to the second refresh mode in response to the changing.

11. The information handling system as described in claim 8 further comprising:
display control logic for displaying a refresh icon on the display screen that identifies the first refresh mode.

12. The information handling system as described in claim 8 further comprising:
a network interface connecting the information handling system to a server computer system;
network logic for requesting refresh data from the server in response to the comparison; and
network logic for receiving the refresh data from the server, wherein the display control logic includes means for displaying the refresh data on the display screen.

13. The information handling system as described in claim 8 further comprising:
input processing logic for receiving one or more refresh setting values from the user, each of the refresh setting values corresponding to at least one of the first customizable refresh settings; and
storage logic for storing the refresh setting values on the nonvolatile storage area.

14. A computer program product stored on a computer operable medium for providing customized screen refresh functions, said computer program product comprising:
means for providing a plurality of user selectable refresh modes, including a manual refresh mode, a manual override mode, and an automatic refresh mode;
means for retrieving one or more first customizable refresh settings, wherein the first customizable refresh settings correspond to a first refresh mode selected from the plurality of user selectable refresh modes;
means for comparing the first customizable refresh settings with corresponding system event data; and
means for refreshing a display screen in response to the comparing, wherein while in the manual refresh mode, the refreshing is performed in response to a user selecting a refresh icon, while in tlhe sutomatic refresh mode, the refreshing is performed is respnse to the comparing, and while in the manual override mode, the refreshing is performed manually until one or more trigger levels are reached that cause the refreshing to be done in response to the comparing.

15. The computer program product as described in claim 14 further comprising:
means for changing from the first refresh mode to a second refresh mode in response to the comparison, wherein the second refresh mode is selected from the plurality of user-selectable refresh modes, and wherein the means for changing includes means for retrieving one or more second customizable refresh settings corresponding to the second refresh mode.

16. The computer program product as described in claim 15 further comprising:
means for displaying a first refresh icon on the display screen corresponding to the first refresh mode; and
means for displaying a second refresh icon on the display screen corresponding to the second refresh mode in response to the changing.

17. The computer program product as described in claim 14 wherein at least one of the first customizable refresh settings is selected from the group consisting of waiting for a task to complete, waiting for a time interval, waiting for a user inactivity period, receiving a change request from a user, and measuring an amount of stale data displayed on the display screen.

18. The computer program product as described in claim 14 further comprising:
means for displaying a refresh icon on the display screen that identifies the first refresh mode.

19. The computer program product as described in claim 14 further comprising:
means for requesting refresh data from a server in response to the comparing; and
means for receiving the refresh data from the server, wherein the refreshing includes displaying the refresh data on the display screen.

20. The computer program product as described in claim 14 further comprising:
 means for receiving one or more refresh setting values from a user, each of the refresh setting values corresponding to at least one of the first customizable refresh settings; and
 means for storing the refresh setting values.

21. A method for providing customized screen refresh functions, said method comprising:
 providing a plurality of user-selectable refresh modes, including a manual refresh mode, a manual override mode, and an automatic refresh mode;
 retrieving one or more customizable refresh settings;
 comparing the customizable refresh settings with corresponding system event data;
 refreshing a display screen in response to the comparing, wherein while in the manual refresh mode, the refreshing is performed in response to a user selecting a refresh icon, while in the automatic refresh mode, the refreshing is performed in response to the comparing, and while in the manual override mode, the refreshing is performed manually until one or more trigger levels are reached that cause the refreshing to be done in response to the comparing;
 invoking one of the user-selectable refresh modes, wherein the invoked refresh mode includes the customizable refresh settings; and
 displaying a refresh icon on the display screen that identifies the invoked refresh mode.

22. A method for providing customized screen refresh functions, said method comprising:
 providing a plurality of user-selectable refresh modes, including a manual refresh mode, a manual override mode, and an automatic refresh mode;
 retrieving one or more customizable refresh settings, wherein the customizable refresh settings correspond to a first refresh mode selected from the plurality of user-selectable refresh modes;
 comparing the customizable refresh settings with corresponding system event data;
 refreshing a display screen in response to the comparing, wherein while in the manual refresh mode, the refreshing is performed in response to a user selecting a refresh icon, while in the automatic refresh mode, the refreshing is performed in response to the comparing an dwhile in the manual override made, the refreshing is performed manually until one or more trigger levels are reached that cause the refreshing to be done in response to the comparing;
 receiving one or more refresh setting values from the user, each of the refresh setting values corresponding to at least one of the customizable refresh settings; and
 storing the refresh setting values.

23. An information handling system comprising:
 one or more processors;
 a memory accessible by the processors;
 a nonvolatile storage area accessible by the processors;
 a display screen accessible by the processors;
 an input device capable of a receiving input from a user corresponding to data displayed on the display screen; and
 a customizable screen refresh tool to control a refresh of the display screen, the customizable screen refresh tool including:
 selection logic for providing a plurality of user-selectable refresh modes, including a manual refresh mode, a manual override mode, and an automatic refresh mode;
 retrieval logic for retrieving one or more first customizable refresh settings, wherein the first customizable refresh settings correspond with a first refresh mode selected from the plurality of user-selectable refresh modes;
 comparison logic for comparing the customizable refresh settings with corresponding system event data;
 display control logic for refreshing the display screen in response to the comparison wherein while in the manual refresh mode, the refreshing is performed in response to a user selecting a refresh icon, while in the automatic refresh mode, the refreshing is performed in response to the comparing, and while the manual override mode, the refreshing is performed manually until one or more trigger levels are reached that cause the refreshing to be done in response to the comparing; and
 control logic for changing from the first refresh mode to a second refresh mode in response to the comparison, wherein the second refresh mode is selected from the plurality of user-selectable refresh modes and wherein the changing includes means for retrieving one or more second customizable refresh settings corresponding to the second refresh mode.

24. An information handling system comprising:
 one or more processors;
 a memory accessible by the processors;
 a nonvolatile storage area accessible by the processors;
 a display screen accessible by the processors;
 an input device capable of a receiving input from a user corresponding to data displayed on the display screen; and
 a customizable screen refresh tool to control a refresh of the display screen, the customizable screen refresh tool including:
 selection logic for providing a plurality of user-selectable refresh modes, including a manual refresh mode, a manual override mode, and an automatic refresh mode;
 retrieval logic for retrieving one or more customizable refresh settings, wherein the customizable refresh settings correspond to a first refresh mode selected from the plurality of user-selectable refresh modes;
 comparison logic for comparing the customizable refresh settings with corresponding system event data;
 display control logic for refreshing the display screen in response to the comparison, wherein while in the manual refresh mode, the refreshing is performed in response to a user selecting a refresh icon, while in the automatic refresh mode, the refreshing is performed in response to the comparing, and while in the manual override mode, the refreshing is performed manually until one or more trigger levels are reached that cause the refreshing to be done in response to the comparing;
 input processing logic for receiving one or more refresh setting values from the user, each of the refresh setting values corresponding to at least one of the customizable refresh settings; and
 storage logic for storing the refresh setting values on the nonvolatile storage area.

25. A computer program product stored on a computer operable medium for providing customized screen refresh functions, said computer program product comprising:
 means for providing a plurality of user-selectable refresh modes, including a manual refresh mode, a manual override mode, and an automatic refresh mode;
 means for retrieving one or more customizable refresh settings;

means for comparing the customizable refresh settings with corresponding system event data;

means for refreshing a display screen in response to the comparing, wherein while in the manual refresh mode, the refreshing is performed in response to a user selecting a refresh icon, while in the automatic refresh mode, the refreshing is performed in response to the comparing, and while in the manual override mode, the refreshing is performed manually until one or more trigger levels are reached that cause the refreshing to be done in response to the comparing;

means for invoking one of the user-selectable refresh modes, wherein the invoked refresh mode includes the customizable refresh settings; and means for displaying a refresh icon on the display screen that identifies the invoked refresh mode.

26. A computer program product stored on a computer operable medium for providing customized screen refresh functions, said computer program product comprising:

means for providing a plurality of user-selectable refresh modes, including a manual refresh mode, a manual override mode, and an automatic refresh mode;

means for retrieving one or more customizable refresh settings, wherein the customizable refresh settings correspond to a first refresh mode selected from the plurality of user-selectable refresh modes;

means for comparing the customizable refresh settings with corresponding system event data;

means for refreshing a display screen in response to the comparing; wherein while in the manual refresh mode, the refreshing is performed in response to a user selecting a refresh icon, while in the automatic refresh mode, the refreshing is performed in response to the comparing, and while in the manual override mode, the refreshing is performed manually until one or more trigger levels are reached that cause the refreshing to be done in response to the comparing;

means for receiving one or more refresh setting values from the user, each of the refresh setting values corresponding to at least one of the customizable refresh settings; and means for storing the refresh setting values.

* * * * *

UNITED STATES PATENT AND TRADEMARK OFFICE
CERTIFICATE OF CORRECTION

PATENT NO. : 6,973,623 B2
DATED : December 6, 2005
INVENTOR(S) : Alex D. Little et al.

It is certified that error appears in the above-identified patent and that said Letters Patent is hereby corrected as shown below:

Column 10,
Line 36, replace "wile" with -- while --.

Column 11,
Line 34, replace "con" with -- icon --.

Column 12,
Line 28, replace "t1he" with -- the --.
Line 29, replace "respnse" with -- response --.

Column 13,
Line 45, replace "an dwhile" with -- and while --.

Column 14,
Line 13, replace "while the manual" with -- while in the manual --.

Signed and Sealed this

Twenty-first Day of February, 2006

JON W. DUDAS
*Director of the United States Patent and Trademark Office*